United States Patent
Argenton et al.

(10) Patent No.: US 7,177,850 B2
(45) Date of Patent: Feb. 13, 2007

(54) METHOD AND APPARATUS FOR DETERMINING A PORTION OF TOTAL COSTS OF AN ENTITY

(75) Inventors: Hans Argenton, Unterhaching (DE); Fritz Kink, Eiselfing (DE)

(73) Assignee: Infineon Technologies AG, Munich (DE)

( * ) Notice: Subject to any disclaimer, the term of this patent is extended or adjusted under 35 U.S.C. 154(b) by 1053 days.

(21) Appl. No.: 09/978,395

(22) Filed: Oct. 16, 2001

(65) Prior Publication Data

US 2003/0083888 A1  May 1, 2003

(51) Int. Cl.
G06F 17/00 (2006.01)
G06G 7/00 (2006.01)
G06Q 99/00 (2006.01)
H04K 1/00 (2006.01)

(52) U.S. Cl. .......................... 705/400; 705/59; 705/52

(58) Field of Classification Search ................ 705/1, 705/7, 30, 51, 52, 57, 59
See application file for complete search history.

(56) References Cited

U.S. PATENT DOCUMENTS 6,230,204 B1 * 5/2001 Fleming, III ................ 709/229
6,282,653 B1 * 8/2001 Berstis et al. ................ 726/26
2002/0077989 A1 * 6/2002 Okayama et al. ............. 705/59

FOREIGN PATENT DOCUMENTS

EP 1 548 541 A2 * 10/2001

OTHER PUBLICATIONS

"Price incentives under price-cap regulation" Foreman, R.D., Information Economics and Policy. vol. 7, No. 4 Dec. 1995.*

* cited by examiner

*Primary Examiner*—John W. Hayes
*Assistant Examiner*—Rutao Wu
(74) *Attorney, Agent, or Firm*—Laurence A. Greenberg; Werner H. Stemer; Ralph E. Locher

(57) ABSTRACT

In a method of and an apparatus for determining a portion of total costs of each entity of a plurality of entities, a maximum value related to a maximum number of accesses of each entity in a time window over a time interval is obtained. Then, the smallest or highest maximum value among the entities is found. The total costs for the smallest maximum value are equally divided among all entities having access to the product in the time interval. Then, a next-higher maximum value among the entities has to be found, and the different costs relating to the next-higher maximum value are determined and equally distributed among the entities having the same or a higher maximum value than the next-higher value. The steps of finding and distributing are repeated until all maximum values are processed. Then, the costs obtained in the steps of distributing are accumulated for each entity.

13 Claims, 5 Drawing Sheets

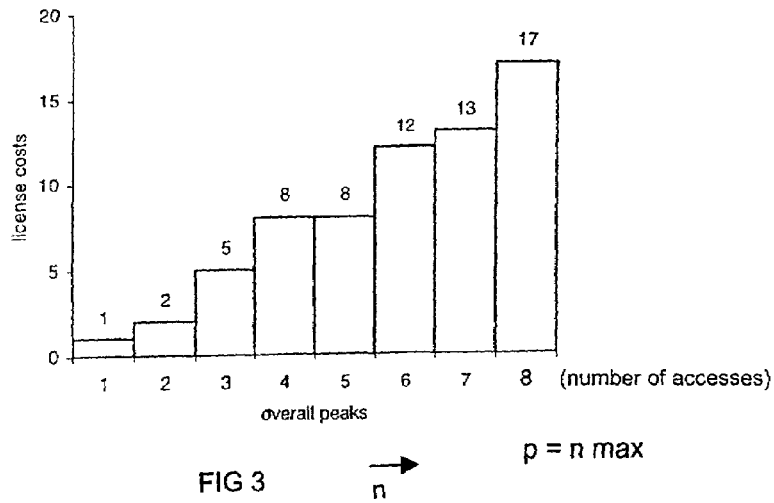
FIG 3    $p = n\ max$    $\overrightarrow{n}$
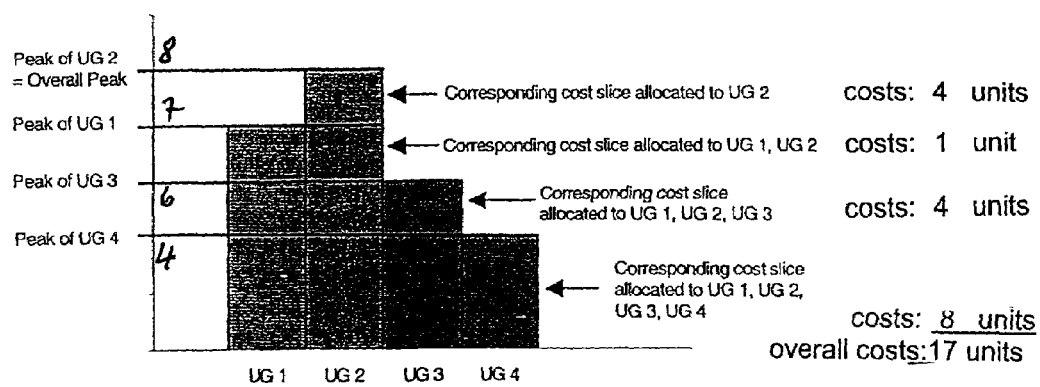
UG 2: 7.833 units
UG 1: 3.833 units
UG 3: 3.33  units
UG 4: 2     units
        17  units
FIG 4

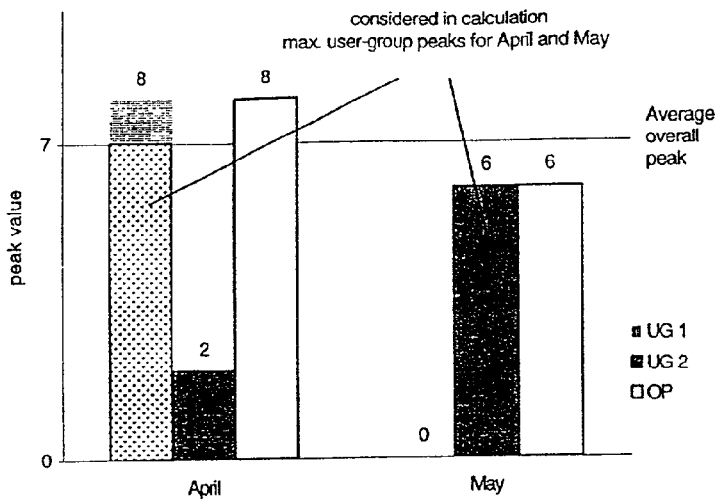
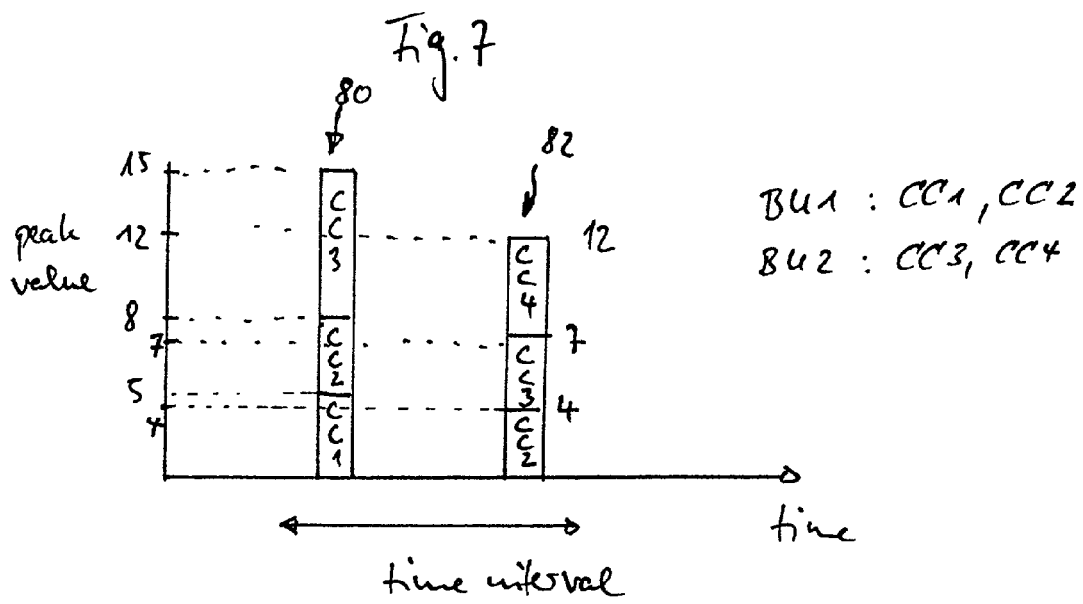
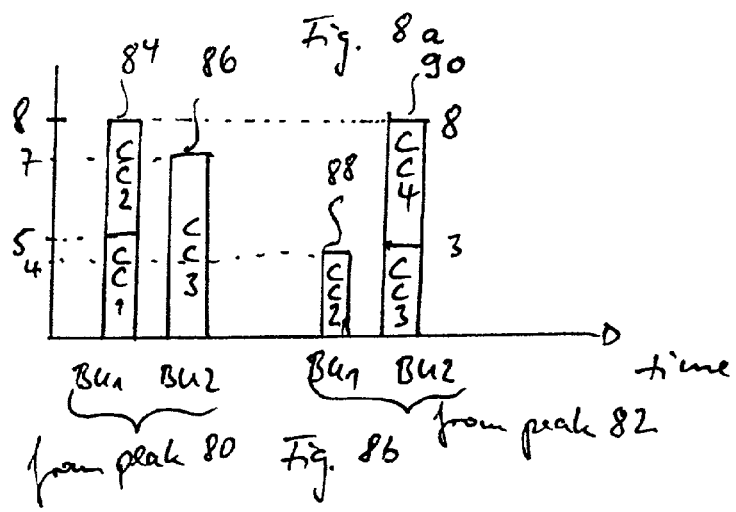

METHOD AND APPARATUS FOR DETERMINING A PORTION OF TOTAL COSTS OF AN ENTITY

BACKGROUND OF THE INVENTION

Field of the Invention

The present invention relates to the field of distribution of costs in a system, in which multiple users or entities have access to a product. In particular, the present invention relates to such a system, in which the total costs are related to a total maximum number of accesses of all entities occurring in a predetermined time window over a time interval, and in which a fair and transparent distribution of the costs among the participating entities is required.

Licenses are an example of a kind of an access to a product that are very expensive. There are two places to influence their costs: (1) the contract that determines the cost model underlying the licensing and (2) the licensee-usage patterns, which altogether determine the actual costs according to the cost model.

In order to determine licensing costs, several possibilities exist. One well-known cost model will be explained below. A company is considered, which is organized in different entities that can be cost centers. The company has decided that it needs, let us say, twenty licenses for, for example, a word processing software residing on a network server. The company has, for example, forty potential users of the software product. Twenty licenses allow twenty users to concurrently have access to the software program on the server. When the twenty-first user wants to have an access to the program, the access is denied, since the company only purchased twenty licenses. When, on the other hand, none of the users or only a small number of users uses the software product concurrently, this does not result in a cost-reduction for the licenses. This is the case, since the cost model states that the company has to pay for the twenty licenses, irrespective of the number of users using the software product. In this case, the cost-distribution to different cost centers is generally made such that each cost center is assigned the same portion of the overall costs, or is assigned a portion of the overall costs according to the number of users belonging to each cost center.

This license model has two problems. One problem is that, if more than twenty licenses are required, it is not possible to obtain a twenty-first access to the program product. On the other hand, when there are only a few accesses to the product, the costs do not decrease, but are the same, irrespective of the actual usage of the twenty licenses.

A new licensing model has recently been developed. This licensing model depends on peak usage and not on the number of purchased licenses or, alternatively, on the amount of license checkout times. In this license model, the customer is granted an option for a very high number of licenses. What the customer has to pay for is, however, the maximum number of simultaneous accesses, i.e., licenses, to the product in a certain billing interval. This cost model does not consider any usage times, etc., but is only directed to the maximum number of simultaneous accesses, i.e., accesses in a certain time window during the time interval.

SUMMARY OF THE INVENTION

It is accordingly an object of the invention to provide a method and an apparatus for determining a portion of total costs of an entity which overcome the above-mentioned disadvantages of the prior art methods and devices of this general type, which achieve a fair cost distribution among different entities having access to the same product.

With the foregoing and other objects in view there is provided, in accordance with a first embodiment of the invention, a method for determining a portion of total costs for each entity of a plurality of entities. The total costs relate to a total maximum number of accesses of all the entities occurring in a predetermined time window over a time interval having a plurality of time windows, to a product, and there exists a predetermined relationship between the total maximum number of accesses of all the entities and the total costs. The method includes obtaining, for each of the entities, a maximum value relating to a maximum number of accesses of the entity in all the time windows over the time interval resulting in a group of maximum values for the plurality of entities. The smallest maximum value is found among the group of maximum values for all the entities. Costs for the smallest maximum value are distributed among all the entities having access to the product in the time interval. A next-higher maximum value is found among the group of maximum values. A difference in costs for the smallest maximum value and the next-higher maximum value is determined from the predetermined relationship. The difference in costs is distributed among the entities having an equivalent or a higher maximum value than the next-higher maximum value. A further next-higher maximum value is repeatedly found from the group of maximum values and a determined difference in costs for the further next-higher maximum value is distributed among the entities having an equivalent or a higher maximum value. The costs obtained in the steps of distributing are accumulated for each of the entities individually to obtain an accumulated cost result. The portion of the total costs for each of the entities based on the accumulated cost result for each of the entities are output.

As has been outlined above, the total costs for the product are determined by the total maximum number of accesses in a predetermined time window. The predetermined time window can have different lengths dependent on the actual license model. A length suitable for one case can be one second, while a length suitable for another case can be as long as one hour. Accesses from different entities that take place during the predetermined time window are also termed "simultaneous" accesses. The simultaneous accesses to the product form an access peak or simply a peak, the peak height being equal to the number of simultaneous accesses, i.e. the accesses that take place in the predetermined time window.

The present invention is based on the finding that cost-transparency and fairness can only be obtained when those single-user access peaks that contribute to the overall peak are determined and considered when distributing costs. It is, however, not fair to distribute all the costs to the entity or user group who caused the overall maximum peak, since then, the other entities that incidentally have a lower access peak would not have to pay anything. A fair cost distribution is, therefore, achieved when, based on the costs staircase, i.e., the predetermined relationship between the maximum number of accesses and license costs, the costs for a peak or maximum value of one entity are e. g. equally distributed to all entities having the same or a higher maximum number of accesses in the time interval. The entity having a smaller maximum value than the peak, however, does not have to pay for the peak of the other entity. This feature clarifies the peak-oriented costs distribution that is performed step-bystep based on determining cost slices for each entity and accumulating the determined cost slices for each entity individually.

When the maximum peak on which the overall costs are based is not caused by a single entity alone, but is caused by accesses of multiple entities, this so-called multi-user peak is broken down into single-user or single-entity peaks. This is performed for all multi-user peaks in a given time interval. When the maximum values for the different entities are extracted, the costs are distributed as described above. The so-called residual costs or allocation costs arising from the fact that more than one entity contributed to the peak decisive for billing are distributed equally among the entities.

In another embodiment of the present invention, hierarchies can be considered. The term hierarchy stands for a system in which an entity includes several sub-entities. The costs of each entity are distributed based on the fixed relationship between the maximum number of accesses and costs. The sub-distribution among sub-entities is performed similar to the original distribution among entities. While the original distribution is directly based on the costs staircase, i.e., the predetermined relationship between accesses and costs, the sub-distribution is only indirectly related to the fixed relationship. In particular, only ratios of the fixed relationship are used, rather than absolute values. The cost sub-distribution is performed by using the cost portion distributed to an entity multiplied by certain ratios derived from the predetermined relationship between accesses and costs.

With the foregoing and other objects in view there is provided, in accordance with a second embodiment of the invention, a method for determining a portion of total costs for each entity of a plurality of entities. The total costs relate to a total maximum number of accesses for all of the entities occurring in a predetermined time window over a time interval having a plurality of time windows, to a product, and there exists a predetermined relationship between the total maximum number of accesses of all the entities and the total costs. The method includes obtaining, for each of the entities, a maximum value relating to a maximum number of accesses of the entity in all the time windows over the time interval resulting in a group of maximum values. A highest maximum value is found from the group of maximum values for the entities and a next-lower maximum value is found from the group of maximum values. A difference in cost is determined for the highest maximum value and the next-lower maximum value from the predetermined relationship. The difference in cost is distributed to the entity having the highest maximum value. Another next-lower maximum value is repeatedly found among the group of maximum values and a determined difference for the next-lower maximum value is distributed among the entities having an equivalent or a higher maximum value. The costs obtained in the steps of distributing are accumulated for each of the individual entities to obtain an accumulated cost result and the portion of the total costs are output for each of the entities based on the accumulated result for each of the entities.

With the foregoing and other objects in view there is provided, in accordance with a third embodiment of the invention, an apparatus for determining a portion of total costs for each entity of a plurality of entities. The total costs relate to a total maximum number of accesses of all the entities occurring in a predetermined time window over a time interval having a plurality of time windows, to a product, and there exists a predetermined relationship between the total maximum number of accesses of all the entities and the total costs. The apparatus contains a processing unit programmed to:
  a) obtain, for each of the entities, a maximum value relating to a maximum number of accesses of the entity in all time windows over the time interval resulting in a group of maximum values;
  b) find the smallest maximum value among the group of maximum values for the entities;
  c) distribute costs for the smallest maximum value among all the entities having access to the product in the time interval;
  d) find a next-higher maximum value among the group of maximum values;
  e) determine a difference in costs for the smallest maximum value and the next-higher maximum value from the predetermined relationship;
  f) distribute the difference in costs among the entities having an equivalent or a higher maximum value than the next-higher value;
  g) repeatedly find a further next-higher maximum value among the entities and distribute a determined difference in costs for the further next-higher maximum value among the entities having an equivalent or a higher maximum value; and
  h) accumulate costs obtained for each of the entities individually to obtain an accumulated cost result and output the portion of the total costs for each of the entities based on the accumulated result for each of the entities.

With the foregoing and other objects in view there is provided, in accordance with a fourth embodiment of the invention, an apparatus for determining a portion of total costs for each entity of a plurality of entities. The total costs relate to a total maximum number of accesses of all the entities occurring in a predetermined time window over a time interval having a plurality of time windows, to a product, and there exists a predetermined relationship between the total maximum number of accesses of all the entities and the total costs. The apparatus includes a processing unit programmed to:
  a) obtain, for each of the entities, a maximum value relating to a maximum number of accesses of the entity in all the time windows over the time interval resulting in a group of maximum values for the entities;
  b) find the highest maximum value among the group of maximum values for the entities;
  c) find a next-lower maximum value among the group of maximum values;
  d) determine a difference in cost for the highest maximum value and the next-lower maximum value from the predetermined relationship;
  e) distribute the difference costs to the entity having the highest maximum value;
  f) repeatedly find another next-lower maximum value among the group of maximum values and distribute a determined difference for the another next-lower maximum value among the entities having an equivalent or a higher maximum value; and
  g) accumulate the costs obtained for each of the entities individually to obtain an accumulated cost result and output the portion of the total costs for each of the entities based on the accumulated result for each of the entities.

In accordance with an added mode of the invention, there is the step of calculating the total costs by combining the total maximum numbers of accesses in more than one time interval. In which the maximum value for each of the entities obtained in the obtaining step is calculated by using a maximum of the maximum number of accesses in the more than one time interval as the maximum value for the entity for the more than one time interval.

In accordance with another mode of the invention, there is the step of performing the repeatedly finding step until a highest maximum value among the entities is processed in the case where the total maximum number of accesses of all the entities is equal to the maximum value of a single one of the entities.

In accordance with an additional mode of the invention, in a case where the total maximum number of accesses is produced by more than one of the entities, performing the following steps before performing the outputting step: calculating a residual cost being a difference between the total maximum number of accesses and a highest maximum value of a single one of the entities; and distributing the residual cost among all the entities equally, and the portion of the total costs for each of the entities equals the accumulated cost result plus a part of the residual costs distributed to each of the entities.

In accordance with a further mode of the invention, there are the steps of organizing at least one of the entities into a plurality of sub-entities; providing a maximum value of accesses for each of the sub-entities; and distributing the portion of the total costs of the entity among the sub-entities based on percentage ratios derived from the predetermined relationship.

In accordance with a further added mode of the invention, there are the steps of performing the distributing of the portion of the total costs of the entity step with the following sub-steps: calculating a ratio of the costs for the maximum value of a sub-entity to the costs for the maximum value of the entity from the predetermined relationship; calculating a cost amount by multiplying the ratio by the portion of the total costs for the entity; and distributing the cost amount among the sub-entities having a maximum value equal to or greater than the maximum value, on which the cost amount is based.

In the invention, the costs are license costs for use of the product and the entities are formed as cost centers.

Alternatively, the entities can be formed as business units, and the sub-entities are formed as the cost centers.

In accordance with a concomitant feature of the invention, there are the steps of allowing a plurality of users to have access to the product; attributing each of the users to one of the entities; and performing the obtaining steps to include sub-steps. The sub-steps include counting a number of accesses of the users attributed to the entity in subsequent time windows to obtain a series of access numbers for the time interval; and searching for a maximum access number in the series to obtain the maximum value for the entity in the time interval.

Other features which are considered as characteristic for the invention are set forth in the appended claims.

Although the invention is illustrated and described herein as embodied in a method and an apparatus for determining a portion of total costs of an entity, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

BRIEF DESCRIPTION OF THE DRAWINGS

FIG. 3 is a bar graph illustrating an example of a predetermined relationship between a maximum number of accesses and total costs;

FIG. 4 is a graph illustrating an inventive distribution of costs to the entities;

FIG. 7 is a chart for explaining the inventive method when the license model includes peak averaging;

FIG. 8a is a graph showing multi-group peaks caused by sub-entities in a hierarchical organization; and FIG. 8b is a graph showing business unit peaks for the example shown in FIG. 8a.

DESCRIPTION OF THE PREFERRED EMBODIMENTS

Figure 1:
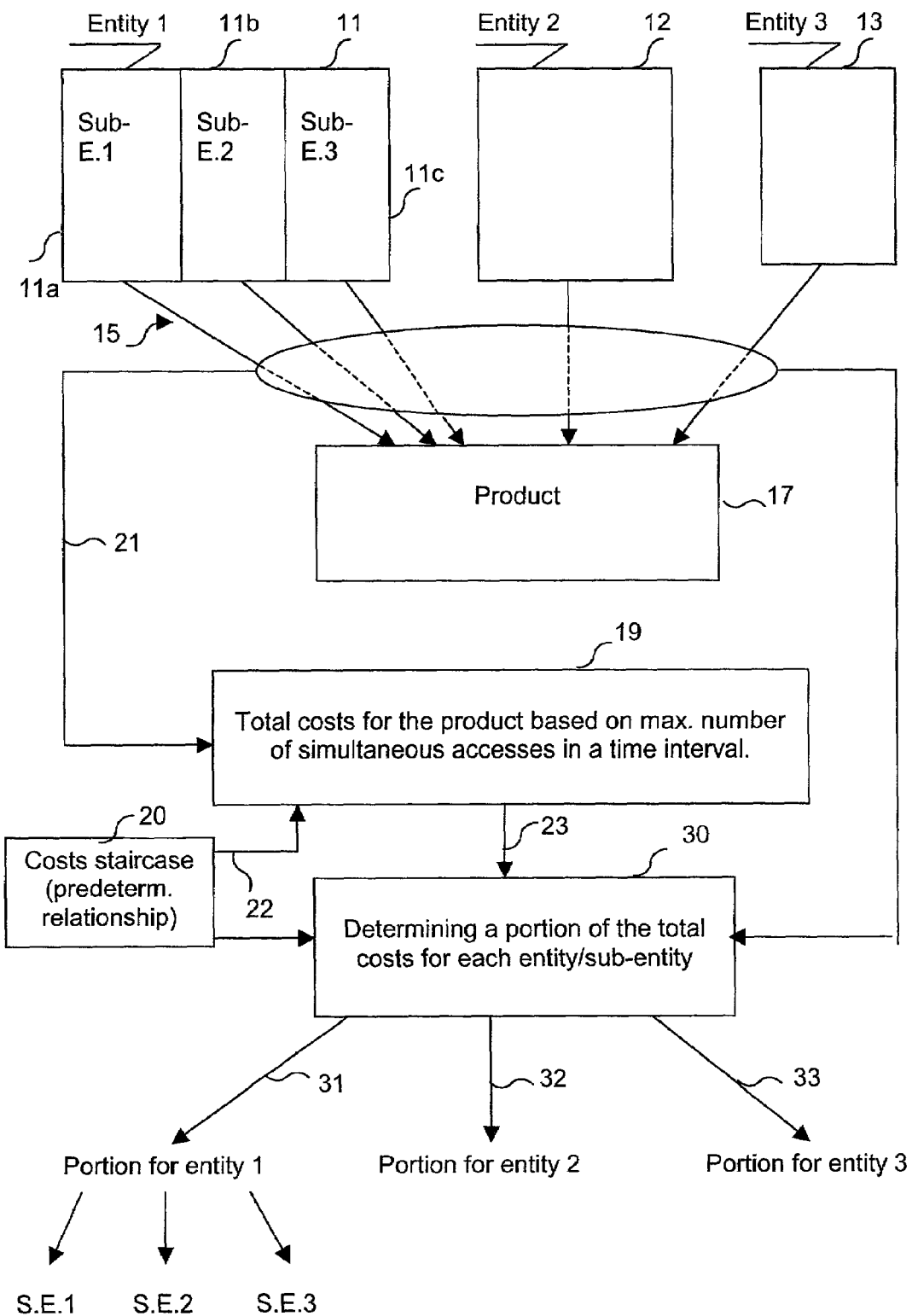
FIG. 1 is a block diagram illustrating a general setting in which the present invention can be carried out.

Referring now to the figures of the drawing in detail and first, particularly, to FIG. 1 thereof, there is shown an overview of the setting, in which the present invention may be carried out. Three entities exists, 11, 12, 13, which may or may not be organized into sub-entities. For illustration purposes, the first entity 11 is shown to contain three sub-entities, 11a, 11b and 11c. All entities or sub-entities have an access 15 to a product 17.

A license model 19 exists which calculates the total costs for using the product based on a maximum number of simultaneous accesses in a certain billing time interval. The license model is based on a cost model 20 that includes a so-called cost staircase that is a predetermined relationship between a maximum number of accesses and the total costs for the maximum number of accesses. The detailed cost model 20 is shown in FIG. 3.

The license model 19 receives, as input, via line 21, a maximum number of simultaneous accesses of all the entities or the sub-entities within the time interval. As another input, the license model 19 receives, via line 22, a cost value for the received maximum number of simultaneous accesses and outputs, via line 23, the total costs for all the entities using the product 17 and for a certain billing interval.

The problem now exists as to how to distribute the total costs output on line 23 by the license model 19 to the different entities. Of course, the costs could be equally distributed among the different entities, irrespective of the actual work of the entities. This cost distribution is regarded as unfair, since all entities have to pay the same amount, although, for example, the third entity 13 has not used the product at all during the billing interval. It is assumed that the first entity 11 was the only entity using the product during the billing interval. Additionally, it is assumed that the first entity 11 includes a certain amount of users to concurrently access to the product that resulted in a high peak and, therefore, high costs. When the users of the first entity 11 know that the total usage costs for the product are equally distributed among all the entities 11, 12, 13, they do not have a special interest in changing their access habits, since the amount, the first entity 11 has to pay is always the same, and it does not matter whether the users try to serialize their needs for the product for reducing license costs or whether the users of the first entity 11 do not think at all of a fair usage of resources.

In FIG. 1 there is shown a block 30 that includes the inventive apparatus and method for determining a portion of the total costs for each of the entities 11, 12, 13 or sub-entities, if an entity includes sub-entities. Block 30 outputs, via lines 31, 32 and 33, the cost portions for the first, second and third entities 11, 12 and 13. The costs allocated for the first entity 11 can be, as will be explained later, again sub-distributed to the sub-entities 11a, 11b and 11c.

Figure 2:
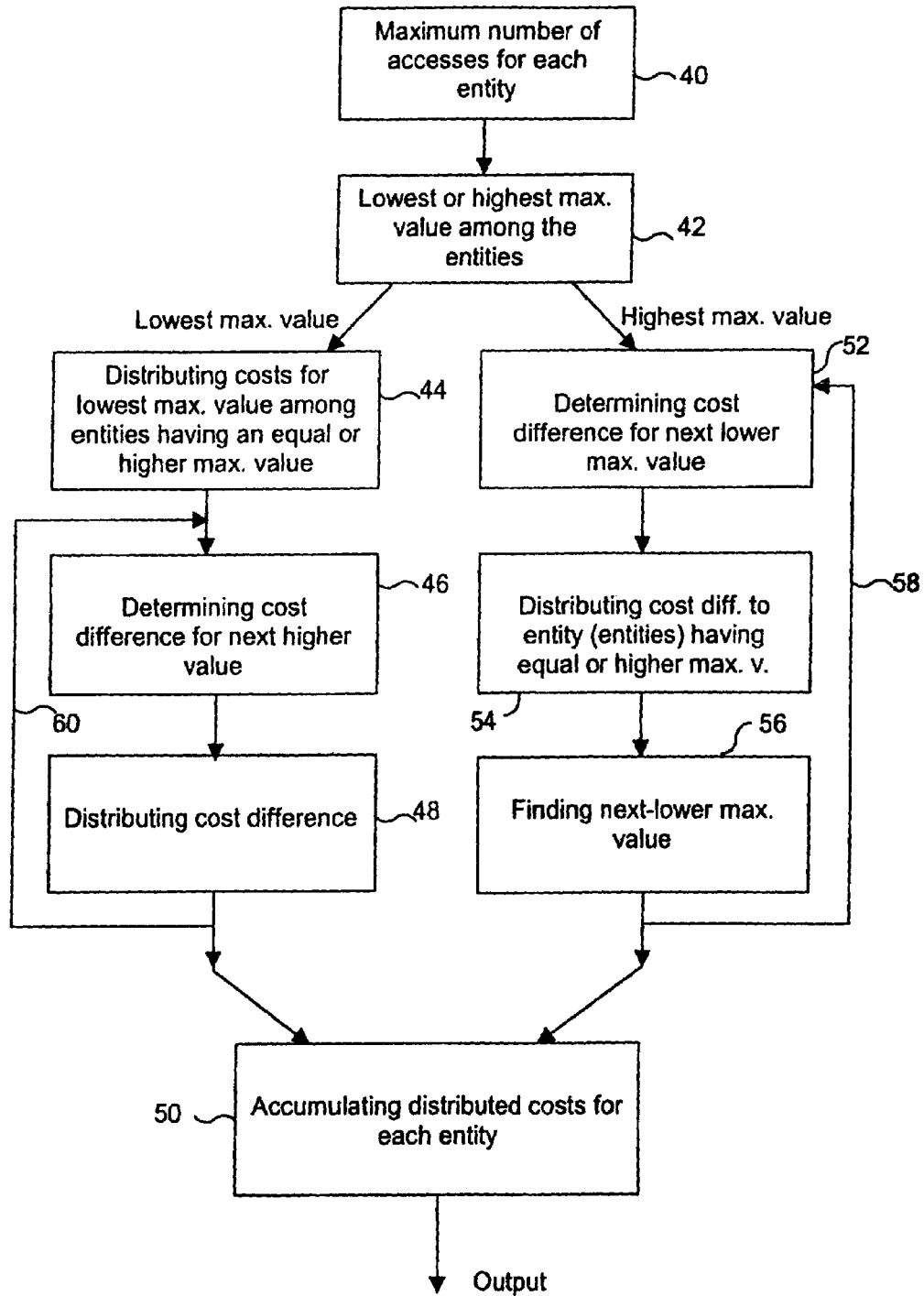
FIG. 2 is a block diagram illustrating the method in two embodiments according to the invention.

Before referring to FIG. 2, reference is made to FIG. 3 illustrating the so-called costs staircase or fixed relationship between the maximum number of accesses and costs. Along the horizontal axis in FIG. 3, the total maximum numbers of accesses of all the entities to the product from 1 to 8 are shown. Along the vertical axis, the license costs are given. When the total maximum number of accesses of all the entities equals to 1, the total costs are one unit. However, when the total maximum number of accesses of all entities equals to 3, the total costs are 5 units. Additionally, when the total maximum number of accesses of all the entities to the product is 4 or 5, the price is the same, i.e., 8 units. The costs staircase given in FIG. 3 illustrates a certain example for an arbitrary license model based on access peaks. Generally, license models will have a kind of a monotonic structure, which results that, in general, the total costs increase with an increasing number of the total maximum number of accesses over a time interval. Naturally, this predetermined relationship does not have to be a linear relationship, but as it is shown in FIG. 3, generally includes non-linearities.

The staircase in FIG. 3 is constructed, when each possible number between 1 and 8 in FIG. 3 is taken and compared to the license model. Note that these are the hypothetical license costs for an overall peak of between 1 and 8 or, generally, for an overall peak n between 1 and p.

It becomes clear from FIG. 3 that for certain values of n, the costs rise from one level to the next level. Additionally, all values of n that yield the same overall costs can be grouped. The range (1 . . . p) is now sub-divided into a "list" of smaller ranges, for each of which the cost is the same for all its members $(1 \ldots s_1), (s_1+1 \ldots s_2), \ldots, (s_{k-1}+1 \ldots p)$. These ranges correspond to the plateaus of the FIG. 3 staircase, while $C_i$ is the cost corresponding to a certain range $(s_{i-1}+1 \ldots s_i)$. Therefore, for $C_1$ the first range equals 1, while, for example, $C_7$ equals 13.

In the following, reference is made to FIG. 2 to illustrate the inventive method. In step 40, a maximum number of accesses of each of the entities 11, 12, 13 in the time window over the considered time interval is obtained. In block 42, the lowest or highest maximum value among the entities is found. First, the left branch of FIG. 2 is considered. In this case, step 42 is performed to find the lowest maximum value among the entities.

For a better explanation of the inventive method, reference is made to FIG. 4. Along the vertical axis in FIG. 4, the maximum number of accesses in a time interval for 4 entities or user groups UG1, UG2, UG3 and UG4 is illustrated. The lowest maximum number of accesses is from user group number UG4. User group number UG4 has a maximum of 4 accesses over the interval. User group UG3 has a maximum value of 6 accesses, user group UG1 has a maximum value of 7 accesses and user group UG2 has a maximum number of 8 accesses.

In step 42 of FIG. 2, user group UG4 will be identified in the present example. The maximum value of accesses of user group UG4 is 4. Four overall peaks correspond to 8 cost units in accordance with the FIG. 3 staircase. Step 44 of FIG. 2 is operative to distribute the total costs for the lowest maximum value among entities having an equal or higher maximum value. In the FIG. 4 example, all the entities, i.e., user groups, have the same or a higher number of maximum values. Therefore, the costs, i.e., 8 units, for a number of 4 accesses to the product are equally distributed among all user groups, as it can be seen from FIG. 4. Thus, the corresponding cost slice allocated to user groups UG1, UG2, UG3 and UG4 is created.

A next higher maximum value has then to be identified. In the FIG. 4 example, this will result in an identification of user group UG3 having 6 overall peaks in the time interval. Six overall peaks result in 12 cost units. Since 8 cost units have already been distributed, only 4 additional units have to be distributed among user group UG1, user group UG2 and user group UG3, but not for user group UG4, since user group UG4 has a maximum value lower than the maximum value of user group UG3.

Referring to FIG. 2, the next step following step 44 is to determine the cost difference for the next higher value (step 46). In the FIG. 4 embodiment, this cost difference equals 4 cost units. Therefore, step 46 will output 4 cost units. In step 48, these 4 cost units are distributed among user group UG1, user group UG2 and user group UG3, such that each user group receives ⅘ cost units. In this way, the corresponding cost slice allocated to user group UG1, user group UG2 and user group UG3 is generated. This proceeding, i.e., finding the next higher value, determining the cost difference for the next higher value and distributing this cost difference among the respective entities is repeated until all maximum values of the entities are processed.

Turning back to FIG. 4, the next higher maximum value is 7, i.e., user group UG1 having an overall peak number of 7, will be identified. Seven accesses correspond to 13 cost units, which is 1 cost unit more than the 12 units corresponding to 6 accesses and user group UG3. Therefore, the cost difference for the next higher value equals to one unit. This one unit is distributed among user group UG1 and user group UG2, since user group UG3 and user group UG4 have lower maximum values than 7 accesses. Therefore, the user group UG1 and user group UG3 each receive 0.5 cost units such that another corresponding cost slice for user group UG1 and user group UG3 is completed.

Finally, the next higher value is found, which will identify user group UG2 as having 8 accesses to the product. 8 accesses correspond to 17 cost units, which are 4 cost units more than the number of cost units for 7 accesses. Since user group UG2 has the highest maximum value, the 4 units, i.e., the cost difference for 8 accesses with respect to 7 accesses, is distributed to user group UG2 only.

In a final step of accumulating 50, the costs distributed to the different user groups are accumulated such that portions for the different entities or user groups are output as indicated in the left corner of FIG. 4.

It can be seen from the cost distribution from FIG. 4 that user group UG2 has to pay the largest portion of total costs, this portion amounting to 7.833 units, since this user group caused a peak, while user group UG4 only has to pay 2 cost units, since this user group only had 4 accesses to the product in the billing time interval.

It also becomes clear from the cost distribution in FIG. 4 that this cost distribution is much more fair when compared to the case in which user group UG2 would have to pay all costs, i.e., 17 units. The cost distribution is also much more fair when compared to the case in which the 17 units are equally distributed among the 4 user groups which would result in 4.25 cost units for each user group. The cost distribution would be unfair regarding user group UG4 and would be "too cheap" for user group UG2.

In other words, the inventive cost distribution scheme works as follows. For allocating the cost in a fair way, we start with the first range $(1 \ldots s_1)$. We take each user group with a maximum peak equal or greater than $s_1$; assume that there are $g_1$ of those groups altogether. In fact, these are all user groups that have used product p at all during the given month. Divide the costs $C_1$ by $g_1$ and allocate $C_1/g_1$ for each group involved.

As the next step, for the range $(s_1+1 \ldots s_2)$, we take each user group with a maximum peak equal or greater than $s_2$; assume there are $g_2$ of these groups. These are all groups that cause the overall peak to be equal or greater than $s_2$. Divide the costs $C_2-C_1$ by $g_2$ and allocate $(C_2-C_1)/g_2$ for each group involved. Note that we allocate $C_2-C_1$ and not $C_2$ because we have allocated $C_1$ already.

In general, for each range $(s_{i-1}+1 \ldots s_i)$, (1<=i<=k, with $s_0=1$ and $s_k=p$), we determine the $g_i$ groups having a maximum peak equal or greater than si and allocate $(C_i-C_{i-1})/g_i$ to each of these groups, ($C_0=0$ and $C_k=C$).

As it can easily be seen, corresponding to the ranges, the overall cost C is partitioned into slices $C_1$, $C_2-C_1$, $C_3-C_2$, . . . , $C_k-C_{k-1}$, the sum of which equals to the overall cost C. Furthermore, for each cost slice, at least one user group participates in the cost allocation for that slice; thus, all cost slices are allocated. From our precondition of Step 1, at least one user group has a maximum peak equal to the overall peak p; consequently for each range $(s_{i-1}+1 \ldots s_i)$, the peak p of the user group is equal or greater than the upper limit $s_i$. Thus, this group will participate in the cost allocation of the cost $C_i$ for that range.

The overall result of this stratified cost-allocation scheme is that the entire costs are allocated—the scheme is correct—and that each user group pays at most only those costs that it would be responsible for, had it been alone in using the product.

In the basic scheme described with respect to FIG. 3 and FIG. 4, it was assumed that there were only peaks that are created by a single user group. In particular, it presupposes that the overall peak p is reached by at least one of the user groups. In accordance with another embodiment of the present invention, this assumption is given up and so called multi-group peaks are considered. It is assumed that two user groups checking out licenses for a product p at the same time. One group takes 4 licenses, the other group takes 6 licenses. This results in an overall peak of 10 licenses. If the basic scheme as outlined with respect to FIG. 4 would be used without modification, the method would be finished at the cost for the group 2 peak of 6, since this is the highest individual peak. The difference between its cost and the costs for the overall peak of 10 would remain unallocated. In accordance with the present invention, the difference between the highest individual peak and the overall peak is equally distributed among all user groups. The logic behind this feature is that the whole community of user groups or entities should be responsible for enabling coincidental shared product usage. The costs that are equally distributed among all user groups are also termed common allocation costs.

Figure 5:
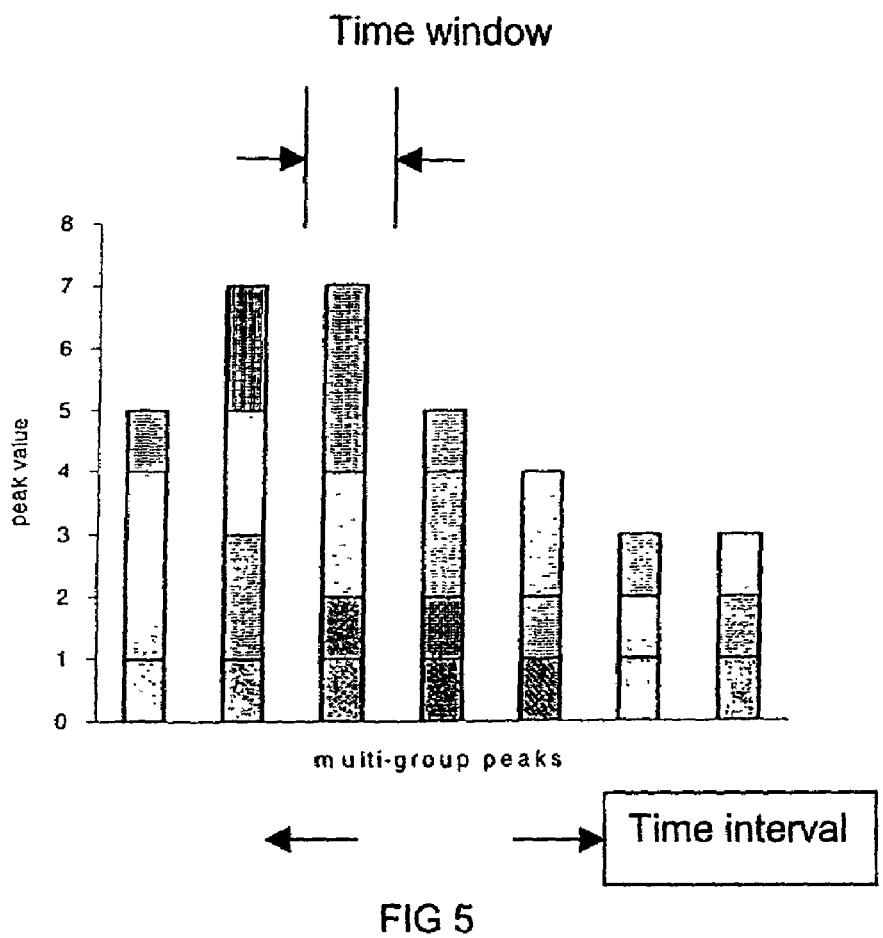
FIG. 5 is a graph illustrating a number of multi-user peaks over a time interval.

For a detailed explanation of multi-group peaks, reference is made to FIG. 5. The horizontal axis of FIG. 5 shows the time axis, while the vertical axis of FIG. 5 shows the number of accesses in a time window along the time axis. It is assumed that all multi-group peaks shown in FIG. 5 fall into the time interval. To handle the multi-group peaks, each multi-group peak is broken-down into single group peaks that contribute to a multi-group peak. The same procedure as described with respect to FIG. 4 is then carried through. Thus, multi-group peaks are treated as many single group peaks and the maximum value of accesses of each single group or entity is determined in the time interval and used for cost distribution.

Figure 6:
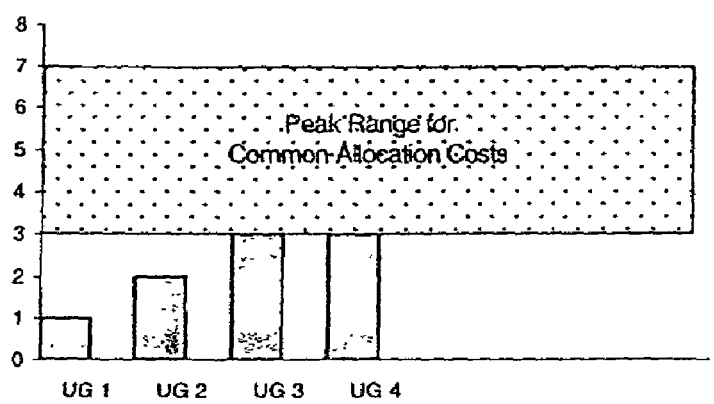
FIG. 6 is a graph illustrating multi-group peaks from FIG. 5, after breaking down to the peaks of the single entities and after extracting the maximum values for each entity.

FIG. 6 shows this situation for the multi-group peaks from FIG. 5. It becomes clear from FIG. 6 that user group UG1 only had a maximum of 1 access in the time interval. User group UG2 had a maximum of 2 accesses and user groups 3 and 4 had a maximum of 3 accesses. With respect to the overall costs, it becomes clear from FIG. 5 that the overall costs are the costs to be paid for 7 accesses.

The cost distribution works as follows. First, the costs for 1 to 3 simultaneous accesses are distributed as outlined with respect to FIG. 4. Then, the costs for 7 accesses less the costs for 3 accesses remain unallocated. These costs are treated as common allocation costs. They are distributed among all user groups in equal portions. The difference of the costs for the highest single-group peak and the costs for the overall peak, which is a multi-group peak in the above-identified example, is equally distributed among all user groups. The argument behind this is that the whole community of entities should be responsible for enabling coincidental shared product usage. As has been outlined above, this equally-distributed part of the license costs are termed common allocation costs.

The embodiments discussed so far allocate the costs of the overall peak from a single time interval. However, license contracts also exist, that usually consider several consecutive time intervals and take the average of the corresponding overall peaks to determine license costs. This procedure levels out unusual or coincidental peaks. If overall peaks are averaged, it seems to be natural to average user-group peaks, too. After averaging, one could apply the approach described in connection with FIG. 4. Although this seems to be the most natural approach, it is not adequate. In order to clarify this, reference is made to FIG. 7. It is assumed that two user groups, i.e., UG1 and UG2 work with product P during two months, April and May. User group UG1 has a peak of 8 in April and does not use P in May. User group UG2 has no use for P in April, but has peak usage of 6 for P in May. Now, the average of the overall peaks yields 7, whereas the averages of the group peaks yield 4 and 3, respectively. As it can be seen from FIG. 7, the difference in costs between the highest average user peak of 4 and the average overall peak of 7 remains unallocated and would be equally distributed among all user groups, although user group UG1 and user group UG2 clearly caused the corresponding overall peaks of that average, while other groups apart from user group UG1 or user group UG2 did not use any licenses at all. Instead of being cause-oriented, this procedure would introduce arbitrariness.

In accordance with the present invention, in order to increase justness and transparency in cost allocation, another approach is applied. For all time intervals, over which the average will be calculated, each user group is assigned the maximum of its interval peaks. This results in that—conceptually—these intervals are united and the maximum peak for each user group for the resulting united interval is selected as a maximum value for the entity. The algorithm described in connection with FIG. 4 is then used for cost distribution. Each cost slice is allocated to the participating user groups. In contrast to the FIG. 4 embodiment, however, the cost allocation will stop at the overall peak, which is the calculated average for the two time intervals April and May. When the average is not an integer, the contracts for products P will state how to calculate the corresponding last cost slice. When averaging over more than one time interval, there can also be the case that the maximum user group peak is higher than the (averaged) overall peak. In this case, the minimum out of the overall peak and the maximum user group peak has to be formed and used as the maximum value for the respective user group. In this way, the maximum value used for cost stratification is related to the maximum number of accesses, wherein the relation consists in the mathematical operation of minimum formation.

It is to be noted that all single-group peaks that are higher than this average will be treated as if they were equal to this average. In the above example illustrated in FIG. 7, the average of the overall peak equals 7. For cost distribution, user group UG1 will participate in all slice allocations until overall peak 7 is processed. After that, the algorithm will stop. Thus, even though user group UG1 has a peak of 8, it is treated as if the peak were 7. This embodiment is advantageous in that costs resulting from high peaks are still allocated among those who have caused the peaks. Furthermore, the averaging reduces the maximum peak value considered. Thus, the goals of cause-orientation and comprehensiveness, while incorporating the leveling effect of averaging for the license costs is still maintained. Another advantage is that the FIG. 7 method is also applicable to multi-user groups. By this method, there does not occur a leveling-out of user-group peaks, but the leveling-out of the overall peak is "propagated" to the single user peaks.

In the following, another embodiment of the present invention is described which constitutes a recursive generalization of the inventive cost distribution method for hierarchical organizations. As has been outlined with respect to FIG. 1, an entity can be divided into several sub-entities, resulting in a hierarchic structure. While the embodiments described thus far consider each access dimension, like site and user group to be flat with respect to peak summation, the following embodiment is able to work with hierarchically-organized dimensions, in which high-level units do not play an autonomous role within license-cost allocation. The inventive cost distribution for hierarchically-structured dimensions results in a distribution of the common-allocation costs adequate to hierarchies. The basic cost-allocation method for each hierarchy level is the same as described in connection with FIG. 4.

If license check-out dimensions, like products, site and user group, are flat, cost distribution as described above yields an optimum approach with respect to cause orientation and cost transparency. When such a dimension is actually hierarchically organized, the subsequently explained embodiment allows an even more cause-orientated and transparent way. By way of example, the hierarchic user groups consist of cost centers (CC) and business units (BU). Additionally, it is assumed that a multi-group peak results from two cost-center peaks of 6 and 4, respectively that belong to one business unit. In the basic embodiment, these cost-center peaks do not sum up to a peak of 10 for the business unit, although their check-outs happen simultaneously. Instead, the business unit peak is equal to 6, the maximum of both cost-center peaks. The remaining cost difference between the maximum cost-center peak of 6 and the overall peak of 10, i.e., the common-allocation costs, would be evenly distributed among all cost units participating in the entire license-cost allocation, not just within that multi-group peak. The reason for this way of calculation is that cost-stratification as described with respect to FIG. 4 originally works with flat dimensions only and does not take hierarchies into account. The above example clearly shows that the multi-group peak of 10 is solely caused by the business unit, to which these two cost centers belong. Thus, it would be much more fair to allocate the cost of that peak completely to this business unit instead of evenly distributing it among all cost centers taking part in the entire process. As a consequence, there would be no common-allocation costs at this stage of allocation. In general, it is the goal of the present invention to reduce the common-allocation costs as much as possible and to apply the cost distribution based on cost slices (see FIG. 4).

In general, in hierarchical structures, the license costs are distributed among entities of the highest level. The costs for each entity are then distributed among the sub-entities of this entity. This hierarchical recursive algorithm can be applied for as many hierarchical levels as required, in that the costs for a sub-entity can be distributed among a plurality of lower-level sub-entities depending from the sub-entity.

Continuing the above example, the costs now allocated to a business unit have to be distributed among the cost centers of the business unit. For simplicity, it is assumed that the two cost centers mentioned above are the only cost centers of that business unit. Cost centers are now the smallest elements of the user-group hierarchy considered and, furthermore, cost centers are the only kind of user groups for sub-entities, the allocation has to deal with at this level of the process. Therefore, all preconditions necessary for the optimal allocation of the original cost-stratification method are now present. Costs are stratified until the maximum cost-center peak of 6 and the remaining difference of 4 is evenly distributed among both cost centers. The following two points are especially remarkable:

a) Hierarchies are important with respect to common-allocation costs. They allow one to treat higher-level peaks as the sum and not the maximum, of the corresponding lower-level peaks. As a consequence, common-allocation costs are propagated as far as possible down the entity hierarchy, thereby minimizing their amount. This clearly improves transparency, and cause-orientation.

b) The generalized cost-allocation algorithm is recursively applied along the user-group hierarchy until its lowest level is reached. Thus, the preferred embodiment is a natural recursive generalization of the basic cost-stratification method. One aspect that has to be mentioned in this regard is that the absolute values of the cost staircase, i.e., the costs for a certain number of accesses, can only be applied for cost stratification in the highest level of hierarchy. As will be outlined in detail below, for the second and the following levels, the fixed relationship has to be applied using the percentage relations between cost steps, rather than the absolute values.

In order to illustrate the hierarchical cost distribution embodiment of the present invention, reference is made to FIGS. 8a and 8b. It is assumed that a business unit BU1 includes cost centers CC1 and CC2 and that another business unit BU2 includes cost centers CC3 and CC4. Additionally, the scenario given with respect to FIG. 8a is considered. Two multi-group peaks 80 and 82 exist in a certain time interval. The multi-group peak 80 has a peak value of 15, while the multi-group peak 82 has a peak value of 12. Thus, the overall costs are determined by the multi-group peak 80. Naturally, one could distribute the costs for the peak value of 15 among all 4 cost centers as described with respect to FIG. 4. However, this would not take the hierarchical structures into account. In particular, one wants to know which are the costs for each business unit. Therefore the business unit hierarchy level takes responsibility for the "peaks" caused by all its associated cost centers.

In order to distribute the costs among the business units 1 and 2, the multi-group peaks 80 and 82 are broken-down into "business unit peaks". Thus, there results business unit peaks 84 and 86 from the multi-group peak 80, and business unit peaks 88 and 90 from the multi-group peak 82. Since the costs for the business units have to be determined, the maximum business unit peak for business unit BU1 and the maximum business unit peak for the business unit BU2 have to be determined from the chart shown in FIG. 8b. The maximum peak for business unit BU1 is peak 84 having a peak value of 8, while the maximum peak for business unit BU2 is peak 90, having also a peak value of 8. In this case, the cost distribution is very simple. Each business unit has to pay half the price, i.e., half the amount given by a cost staircase for a peak value of 15.

Now, the first recursion or the cost allocation to the entities in the highest hierarchy level is completed. The next step will be to allocate the costs of each business unit among the cost centers. Therefore the costs for the business unit BU1 has to be distributed among cost centers CC1 and CC2 and the costs for business unit BU2 have to be distributed among cost centers CC3 and CC4. At this level, business unit peaks are multi-group peaks, since they consist of the peaks of their associated cost centers. The "multi-group peaks" from FIG. 8b now have to be broken-down into single group peaks to identify the maximum peaks of each group. When the peaks in FIG. 8b are then broken-down, it becomes clear that CC1 has a maximum peak of 5, CC2 has a maximum peak of 4, CC3 has a maximum peak of 7 and CC4 has a maximum peak of 5. It is to be noted that the maximum peak of CC2 is not contained in the maximum peak of business unit BU1. In general, a maximum peak of a higher-level group need not contain even a single maximum peak of any of its lower-level members. This is a natural consequence of the fact that the overall peak need not contain any maximum single-group peaks.

The maximum peaks named above are now used to distribute the business-unit cost. Thus, for this application level of the stratification method, the costs for each business unit take the place of the top-level overall costs. In order to derive their share for each cost center, the original cost staircase is used, but now with the percentage relations between the steps of the staircase, rather than the absolute values of the staircase (the absolute values were used in the first recursion step). Now, the contract pattern of cost increase per peak has to be transferred to the new situation. To this end, the contract costs of the highest maximum peak for each business unit is taken as 100% and the contract costs of each lower peak are expressed as percentages in relation to the costs of the highest maximum peak. In the example, the highest maximum peak for the business unit BU1 is 5. The cost fraction for the peak of CC2 of 3 is contract-cost(3)/contract-cost(5). By using these percentages, a key exists for distributing the costs of a business-unit among its cost centers.

The distribution of the business-unit costs among their cost centers will now be discussed in detail. The business unit BU1 has costs corresponding to a peak of 8. Of these costs, the costs for the maximum cost center peak of 5 are stratified among CC1 and CC2 in accordance with the FIG. 4 algorithm. From the remaining costs corresponding to the difference between the overall peak of 8 and the maximum cost center peak of 5, each cost center takes half the difference. The same is done for business unit BU2. The maximum cost-center peak here is 7. Thus, the costs corresponding to a peak of 7 are stratified among CC3 and CC4. Of the rest, the difference between the peak of 8 and the peak of 7, CC3 and CC4 each take one half. These difference costs are the common allocation costs.

In the following, the above example will be numerically set out based on the FIG. 3 fixed relationship between license costs and the number of accesses or "overall peaks". As has been outlined above, each business unit is responsible for half the costs of a multi-group peak of 15, which is not included in the FIG. 3 staircase. However, it is assumed that the price for a peak of 15 is US$ 20,000. Thus, each business unit, i.e., business unit BU1 and business unit BU2 each have to pay an amount of US$ 10,000 for a maximum value of 8 licenses or accesses, each business unit had. Referring to the FIG. 3 cost staircase, the percentage for 5 licenses with respect to 8 licenses is 8 (the license costs for a peak having 5 accesses) to 17 (the license costs for a peak having 8 accesses). The fraction equals to 47% ($8/17$). The fraction for 3 licenses is 5 (the license costs for 3 licenses) to 17 (the license costs for 8 licenses). This fraction equals to a percentage of 29% ($5/17$). Thus, the percentage costs of 5 licenses are 47% of US$ 10,000, i.e., US$ 4,700. The percentage costs for 3 licenses are 29% of US$ 10,000, i.e., US$ 2,900. The basic cost allocation algorithm described with respect to FIG. 4 can now be applied. First, the costs for 3 licenses (cost center CC2) for business unit BU1 (peak 84 in FIG. 8b), i.e., US$ 2,900 are distributed between the cost center CC1 and the cost center CC2. Thus, each cost center has a first cost slice of US$ 1,450. The difference between the costs for 5 licenses (US$ 4,700) and the costs for 3 licenses (US$ 2,900), which amounts to US$ 1,800, is attributed to cost center CC1 alone. The remaining difference, i.e., US$ 10,000–US$ 4,700=US$ 5,300, are the common allocation costs, which are equally distributed among cost center CC1 and cost center CC2, such that each cost center receives an additional US$ 2,650. Thus, the accumulated costs for cost center CC1 are US$ 5,900 and the accumulated costs for cost center CC2 are US$ 4,100. The sum of the accumulated costs equals to US$ 10,000 for business unit BU1.

In the above example, the recursion is complete, since only two hierarchy levels exists, because the cost centers are considered atomic. They cannot be broken down into smaller units. As it can be seen, the overall costs for a peak of 15 are entirely allocated among business units and then further among cost centers.

The above algorithm can be generalised as follows:
Initialization: Calculate overall costs
  parent level=top level of the hierarchical dimension
  child level=next-lower level Generalized Cost-Stratification Procedure Apply the basic cost-stratification algorithm treating each child-level group as single-group.
Assign allocated costs to the corresponding child-level groups if child level is not lowest level.
For each child-level group:
Take the highest maximum peak m of the group and calculate the new peak-to-cost relation by mapping each maximum peak i of the next-lower level contained in the group to (contract-cost-for-peak(i)/contract-cost-for-peak (m))* cost-allocated-to-the-group.

Apply the Generalized Cost-Stratification Procedure with new parent level=current child level and new child level=next-lower level.

It has to be outlined that not only user groups can be perceived as hierarchies, but also sites. The inventive generalized cost-stratification algorithm makes is easy to select one from a set of given hierarchical dimensions and to allocate overall costs according to this hierarchy.

Although the inventive cost distribution algorithm has been described in connection with FIG. 4 such that it is started from the lowest maximum value and then step-by-step propagated to the highest maximum number of an entity, this scheme can also be reversed. To this end, reference is made to the right branch in FIG. 2. When the cost distribution method is performed starting from the highest maximum value among the entities, the next lower maximum value has first to be found.

Regarding FIG. 4, this results in that, first, the user group UG2 having a peak value of 8 is identified and then the user group UG1, which has the next lower peak value. Then, the cost difference between the highest maximum value and the next lower maximum value has to be determined (step 52 of FIG. 2). The cost difference just determined is then distributed to user group UG2 alone, or generally, to the user groups having the same or a higher maximum value. Since user group UG2 has the highest maximum value, it exclusively receives the difference that amounts in the FIG. 4 example to 4 units (step 54 in FIG. 2). The algorithm then proceeds with step 56 of finding a next lower maximum value. In this case, the user group UG3 from FIG. 4 would be identified. Then, again, a cost difference for this next lower maximum value is determined and distributed (steps 52 and 54). This is indicated by a back-directed arrow 58 in the right branch of FIG. 2, which roughly corresponds to the recursive arrow 60 in the left branch of FIG. 2.

It becomes clear from the above that the inventive method of cost distribution can be carried through from the bottom of FIG. 4 to the top of FIG. 4 (user group UG4 to user group UG2) or, in reverse direction, from the top of FIG. 4 (user group UG2) to the bottom of FIG. 4 (user group UG4).

We claim:

1. A method for determining a portion of total costs for each entity of a plurality of entities, the total costs relating to a total maximum number of accesses of all the entities occurring in a predetermined time window over a time interval having a plurality of time windows, to a product, and there exists a predetermined relationship between the total maximum number of accesses of all the entities and the total costs, the method which comprises the steps of:

obtaining, for each of the entities, a maximum value relating to a maximum number of accesses of the entity in all the time windows over the time interval resulting in a group of maximum values for the plurality of entities;

finding a smallest maximum value among the group of maximum values for all the entities;

distributing costs for the smallest maximum value among all the entities having access to the product in the time interval;

finding a next-higher maximum value among the group of maximum values;

determining a difference in costs for the smallest maximum value and the next-higher maximum value from the predetermined relationship;

distributing the difference in costs among the entities having an equivalent or a higher maximum value than the next-higher maximum value;

repeatedly finding a further next-higher maximum value among the group of maximum values and distributing a determined difference in costs for the further next-higher maximum value among the entities having an equivalent or a higher maximum value;

accumulating the costs obtained in the steps of distributing for each of the entities individually to obtain an accumulated cost result; and outputting the portion of the total costs for each of the entities based on the accumulated cost result for each of the entities.

2. The method according to claim 1, which comprises calculating the total costs by combining the total maximum numbers of accesses in more than one time interval, in which the maximum value for each of the entities obtained in the obtaining step is calculated by using a maximum of the maximum number of accesses in the more than one time interval as the maximum value for the entity for the more than one time interval.

3. The method according to claim 2, which comprises performing the repeatedly finding step until a highest maximum value among the entities is processed in a case where the total maximum number of accesses of all the entities is equal to the maximum value of a single one of the entities.

4. The method according to claim 1, wherein in a case where the total maximum number of accesses is produced by more than one of the entities, performing the following steps before performing the outputting step:

calculating a residual cost being a difference between the total maximum number of accesses and a highest maximum value of a single one of the entities; and distributing the residual cost among all the entities equally, and the portion of the total costs for each of the entities equals the accumulated cost result plus a part of the residual costs distributed to each of the entities.

5. The method according to claim 1, which comprises:

organizing at least one of the entities into a plurality of sub-entities;

providing a maximum value of accesses for each of the sub-entities; and distributing the portion of the total costs of the entity among the sub-entities based on percentage ratios derived from the predetermined relationship.

6. The method according to claim 5, which comprises performing the distributing of the portion of the total costs of the entity step with the following sub-steps:

calculating a ratio of the costs for the maximum value of a sub-entity to the costs for the maximum value of the entity from the predetermined relationship;

calculating a cost amount by multiplying the ratio by the portion of the total costs for the entity; and distributing the cost amount among the sub-entities having a maximum value equal to or greater than the maximum value, on which the cost amount is based.

7. The method according to claim 1, which comprises setting the costs to be license costs for the product.

8. The method according to claim 1, which comprises forming the entities as cost centers.

9. The method according to claim 5, which comprises forming the entities as business units, and the sub-entities as cost centers.

10. The method according to claim 1, which comprises:

allowing a plurality of users to have access to the product;

attributing each of the users to one of the entities; and performing the obtaining steps to include the following sub-steps:

counting a number of accesses of the users attributed to the entity in subsequent time windows to obtain a series of access numbers for the time interval; and searching for a maximum access number in the series to obtain the maximum value for the entity in the time interval.

11. A method for determining a portion of total costs for each entity of a plurality of entities, the total costs relating to a total maximum number of accesses for all of the entities occurring in a predetermined time window over a time interval having a plurality of time windows, to a product, and there exists a predetermined relationship between the total maximum number of accesses of all the entities and the total costs, the method which comprises the steps of:

obtaining, for each of the entities, a maximum value relating to a maximum number of accesses of the entity in all the time windows over the time interval resulting in a group of maximum values;

finding a highest maximum value among the group of maximum values for the entities;

finding a next-lower maximum value among the group of maximum values;

determining a difference in cost for the highest maximum value and the next-lower maximum value from the predetermined relationship;

distributing the difference in cost to the entity having the highest maximum value;

repeatedly finding another next-lower maximum value among the group of maximum values and distributing a determined difference for the next-lower maximum value among the entities having an equivalent or a higher maximum value; and accumulating the costs obtained in the steps of distributing for each of the individual entities to obtain an accumulated cost result and outputting the portion of the total costs for each of the entities based on the accumulated result for each of the entities.

12. An apparatus for determining a portion of total costs for each entity of a plurality of entities, the total costs relating to a total maximum number of accesses of all the entities occurring in a predetermined time window over a time interval having a plurality of time windows, to a product, and there exists a predetermined relationship between the total maximum number of accesses of all the entities and the total costs, the apparatus comprising:

means for obtaining, for each of the entities, a maximum value relating to a maximum number of accesses of the entity in all time windows over the time interval resulting in a group of maximum values;

means for finding the smallest maximum value among the group of maximum values for the entities;

means for distributing costs for the smallest maximum value among all the entities having access to the product in the time interval;

means for finding a next-higher maximum value among the group of maximum values;

means for determining a difference in costs for the smallest maximum value and the next-higher maximum value from the predetermined relationship;

means for distributing the difference in costs among the entities having an equivalent or a higher maximum value than the next-higher value;

means for repeatedly finding a further next-higher maximum value among the entities and distributing a determined difference in costs for the further next-higher maximum value among the entities having an equivalent or a higher maximum value; and means for accumulating costs obtained for each of the entities individually to obtain an accumulated cost result and output the portion of the total costs for each of the entities based on the accumulated result for each of the entities.

13. An apparatus for determining a portion of total costs for each entity of a plurality of entities, the total costs relating to a total maximum number of accesses of all the entities occurring in a predetermined time window over a time interval having a plurality of time windows, to a product, and there exists a predetermined relationship between the total maximum number of accesses of all the entities and the total costs, the apparatus comprising:

means for obtaining, for each of the entities, a maximum value relating to a maximum number of accesses of the entity in all the time windows over the time interval resulting in a group of maximum values for the entities;

means for finding the highest maximum value among the group of maximum values for the entities;

means for finding a next-lower maximum value among the group of maximum values;

means for determining a difference in cost for the highest maximum value and the next-lower maximum value from the predetermined relationship;

means for distributing the difference costs to the entity having the highest maximum value;

means for repeatedly finding another next-lower maximum value among the group of maximum values and distributing a determined difference for the other next-lower maximum value among the entities having an equivalent or a higher maximum value; and means for accumulating the costs obtained for each of the entities individually to obtain an accumulated cost result and output the portion of the total costs for each of the entities based on the accumulated result for each of the entities.

* * * * *